(12) United States Patent  
Suzuki

(10) Patent No.: US 8,520,071 B2  
(45) Date of Patent: Aug. 27, 2013

(54) BOUNDARY LINE DETECTION SYSTEM WITH IMPROVED DETECTION-PERFORMANCE

(75) Inventor: Shunsuke Suzuki, Aichi-ken (JP)

(73) Assignee: Denso Corporation, Kariya (JP)

( * ) Notice: Subject to any disclaimer, the term of this patent is extended or adjusted under 35 U.S.C. 154(b) by 269 days.

(21) Appl. No.: 12/932,325

(22) Filed: Feb. 23, 2011

(65) Prior Publication Data

US 2011/0205363 A1   Aug. 25, 2011

(30) Foreign Application Priority Data

Feb. 24, 2010   (JP) ................................. 2010-039139

(51) Int. Cl.  
*H04N 7/18*   (2006.01)

(52) U.S. Cl.  
USPC ........................................................ 348/148

(58) Field of Classification Search  
USPC ........................................................ 348/148  
See application file for complete search history.

(56) References Cited

U.S. PATENT DOCUMENTS

2009/0268026 A1* 10/2009 Mori ............................. 348/148  
2010/0060738 A1*  3/2010 Kataoka et al. .............. 348/148  
2010/0188507 A1*  7/2010 Kageyama et al. .......... 348/148

FOREIGN PATENT DOCUMENTS

| JP | 2004-240636 | 8/2004 |
| JP | 2005-182303 | 7/2005 |
| JP | 2007-141052 | 6/2007 |
| JP | 2008-030619 | 2/2008 |

OTHER PUBLICATIONS

Office action dated Jan. 10, 2012 in corresponding Japanese Application No. 2010-039139.

* cited by examiner

*Primary Examiner* — Richard Torrente  
(74) *Attorney, Agent, or Firm* — Harness, Dickey & Pierce, PLC

(57) ABSTRACT

In a boundary line detection system installed in a vehicle, an edge-point extracting unit extracts a plurality of edge points from an image of a road. A noise determining unit determines whether a number of edge points in the plurality of edge points are aligned in a direction corresponding to a vertical direction of the road. The number of edge points have an interval therebetween equal to or smaller than a preset interval. When it is determined that the number of edge points are aligned in the direction corresponding to the vertical direction of the road with the interval of the number of edge points being equal to or smaller than the preset interval, the noise determining unit determines that the number of edge points as noises.

3 Claims, 5 Drawing Sheets

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 1 | 0 | 0 | 0 | 0 | 0 |
| 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

IF VERTICALLY ALIGNED EDGE POINTS INCLUDE NON-EDGE POINT, THEY CAN BE DETERMINED AS EDGE POINTS OF NOISES (B)

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 0 | 0 | 1 | 0 | 0 | 0 | 0 | 0 |
| 0 | 0 | 0 | 0 | 0 | 0 | 0 | 1 | 0 | 0 | 0 | 0 | 0 | 0 |
| 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

IF EDGE POINTS OF ADJACENT COLUMNS ARE TOTALLY ALIGNED VERTICALLY, THEY CAN BE DETERMINED AS EDGE POINTS OF NOISES

BOUNDARY LINE DETECTION SYSTEM WITH IMPROVED DETECTION-PERFORMANCE

CROSS REFERENCE TO RELATED APPLICATIONS

This application is based on Japanese Patent Application 2010-39139 filed on Feb. 24, 2010. This application claims the benefit of priority from the Japanese Patent Application, so that the descriptions of which are all incorporated herein by reference.

TECHNICAL FIELD

The present disclosure relates to boundary line detection systems to be installed in motor vehicles, and more particularly, to such boundary line detection systems having an improved detection-performance in comparison to that of conventional boundary line detection systems.

BACKGROUND

Boundary lines represent boundary markers in the form of objects or lines to divide a corresponding road into plural parts as lanes. For example, they consist of solid or dashed white painted lines placed on the corresponding road along each lane thereof, or consist of raised markers placed on the corresponding road intermittently along each lane thereof. Thus, in order to improve the running safety of motor vehicles, it is important for the motor vehicles in running one lane of a road ahead thereof to accurately recognize the boundary lines formed on the road.

In view of the circumstances, boundary line detection systems are installed in motor vehicles. Such a boundary line detection system installed in a motor vehicle picks up an image (a road image) of a region including a road (road surface) ahead of the motor vehicle, and subjects the road image to image processing to thereby extract edge points indicative of painted white lines and/or raised markers. In addition, the boundary line detection system detects boundary lines on the road based on the edge points. One of these boundary line detection systems is disclosed in Japanese Patent Application Publication No. 2007-141052.

Boundary lines to be detected by a boundary line detection system are used, in combination of information indicative of the behavior of a corresponding vehicle, such as its travelling direction, travelling speed, and/or steering angle, for prediction of whether a corresponding vehicle will depart from a corresponding lane and/or for automatic control of steering wheel.

SUMMARY

These boundary line detection systems may extract, in addition to edge points of boundary lines, edge points of noises except for the positions of the boundary lines in a road image. A large number of extracted edge points of noises may cause misdetection of boundary lines. Thus, these boundary line detection systems need a process to remove such noises in road images.

Various approaches to eliminate noises have been used. For example, one approach uses a luminance filter to eliminate extracted edge points whose luminance values are determined not to be those of edge points of boundary lines. This approach also eliminates, when determining that the size of a structural object predicted by extracted edge points is not within a preset range, the extracted edge points as noises. This approach uses Hough transform to detect boundary lines if there are a few number of extracted edge points in order to prevent misdetection of boundary lines whose edge points are noises.

However, the approach set forth above may not reliably eliminate edge points of noises. For example, let us consider the following situation that a boundary line detection system installed in a vehicle running on a target lane of a road detects, using the approach, edge points of a structural object of an alternative vehicle travelling a lane of the same road adjacent to the target lane; this structural object is located close to the road surface, such as a wheel of the alternative vehicle. In this situation, the size and the luminance values of the structural object may be close to those of markers consisting of a boundary line depending on the material of the structural object, the state of surface treatment of the structural object, and/or the angle of the structural object projected on a road image. This results in that the boundary line detection system may not remove edges of noises based on this approach using the luminance filter and the size of structural objects.

In addition, the Hough transform has a low possibility for misdetection of noises as boundary lines if there are a large number of extracted edges indicative of the boundary lines. However, the Hough transform is likely to fail to detect noises as boundary lines if there are a few number of extracted edges indicative of the boundary lines. When a boundary line detection system installed in a vehicle running on a target lane of a road detects, using the approach and the Hough transform, markers consisting of boundary lines, which are placed intermittently on the road along its travelling direction, such as Botts' dots (raised lane markers) and cat's eyes (raised lane markers), proper edges of these markers are likely to be small. This may increase misdetection problems set forth above.

In view of the circumstances set forth above, an aspect of the present disclosure seeks to provide boundary line detection systems installed in corresponding vehicles and designed to have an improved detection performance of boundary lines formed on a road ahead of the corresponding vehicles in comparison to normal boundary line detection systems using the approach set forth above.

According to one aspect of the present disclosure, there is provided a boundary line detection system installed in a vehicle. The boundary line detection system includes an image pickup unit that picks up an image of a target region including a road ahead of the vehicle, an edge-point extracting unit that extracts a plurality of edge points from the image picked-up by the image pickup unit, and a noise determining unit. The noise determining unit determines whether a number of edge points in the plurality of edge points are aligned in a direction corresponding to a vertical direction of the road, the number of edge points having at least one interval therebetween equal to or smaller than a preset interval, and, when it is determined that the number of edge points are aligned in the direction corresponding to the vertical direction of the road with the at least one interval of the number of edge points being equal to or smaller than the preset interval, determines that the number of edge points as noises. The boundary line detection system includes a detecting unit that detects at least one boundary line marked on the road based on a remainder of the plurality of edge points from which the number of edge points as the noises have been extracted.

According to another aspect of the present disclosure, there is provided a computer program product. The computer program includes a computer usable medium, and a set of computer program instructions embodied on the computer useable medium. The instructions includes a first instruction to capture an image of a target region including a road ahead of a vehicle picked up by an image pickup unit, a second instruction to extract a plurality of edge points from the image picked-up by the image pickup unit, a third instruction to determine whether a number of edge points in the plurality of edge points are aligned in a direction corresponding to a vertical direction of the road, the number of edge points having at least one interval therebetween equal to or smaller than a preset interval. The instructions include a fourth instruction to, when it is determined that the number of edge points are aligned in the direction corresponding to the vertical direction of the road with the at least one interval of the number of edge points being equal to or smaller than the preset interval, determine that the number of edge points as noises, and a fifth instruction to detect at least one boundary line marked on the road based on a remainder of the plurality of edge points from which the number of edge points as the noises have been extracted.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

Figure 1:
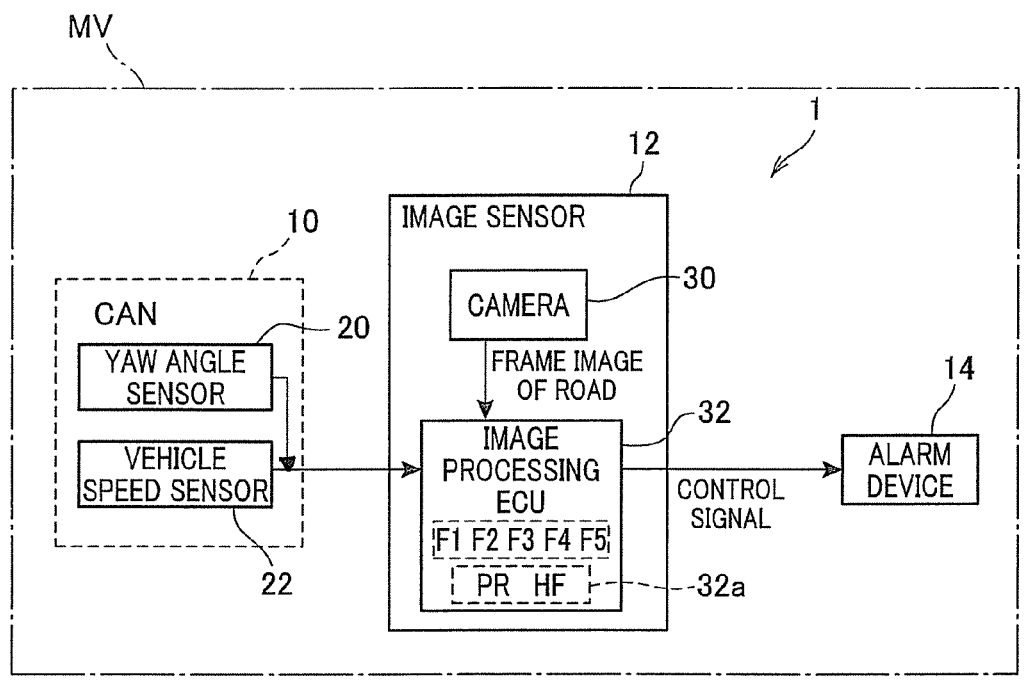
FIG. 1 is a block diagram schematically illustrating an example of the overall hardware structure of a lane departure alarming system installed in a motor vehicle according to an embodiment of the present disclosure.
Figure 3:
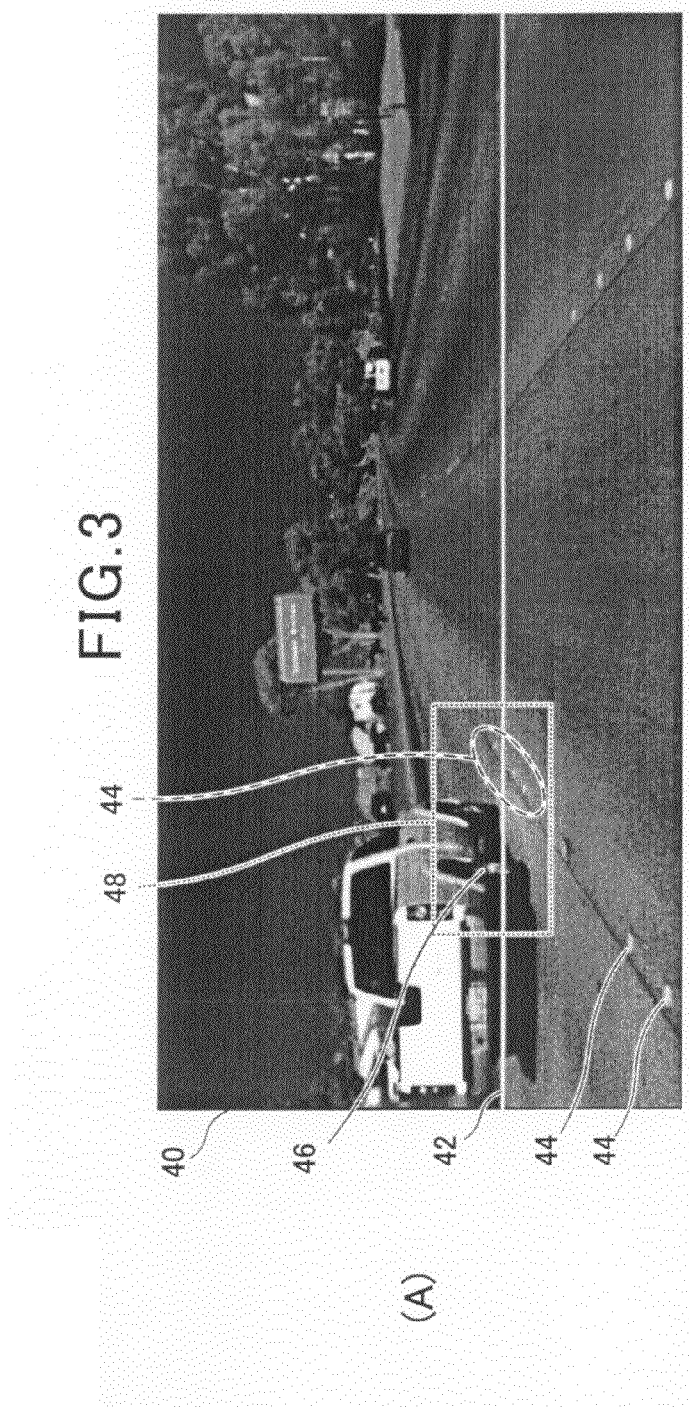
Figure 3:
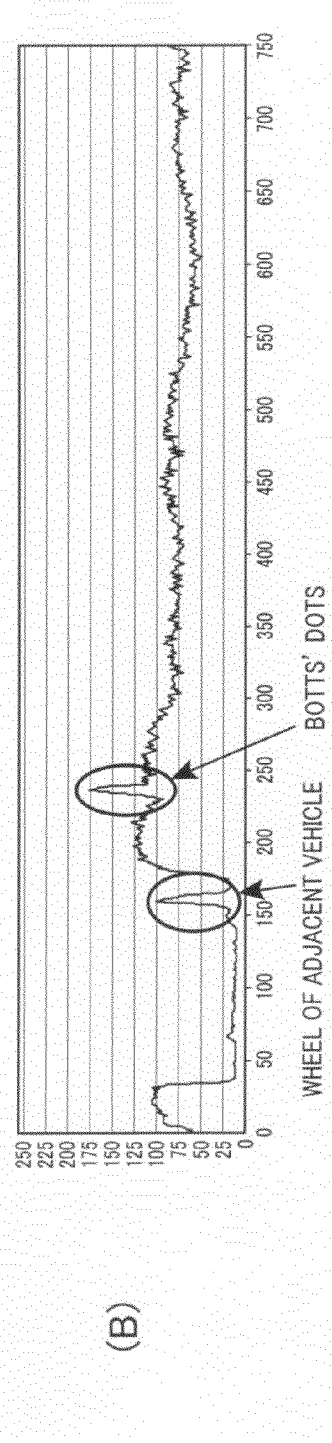
Figure 4:
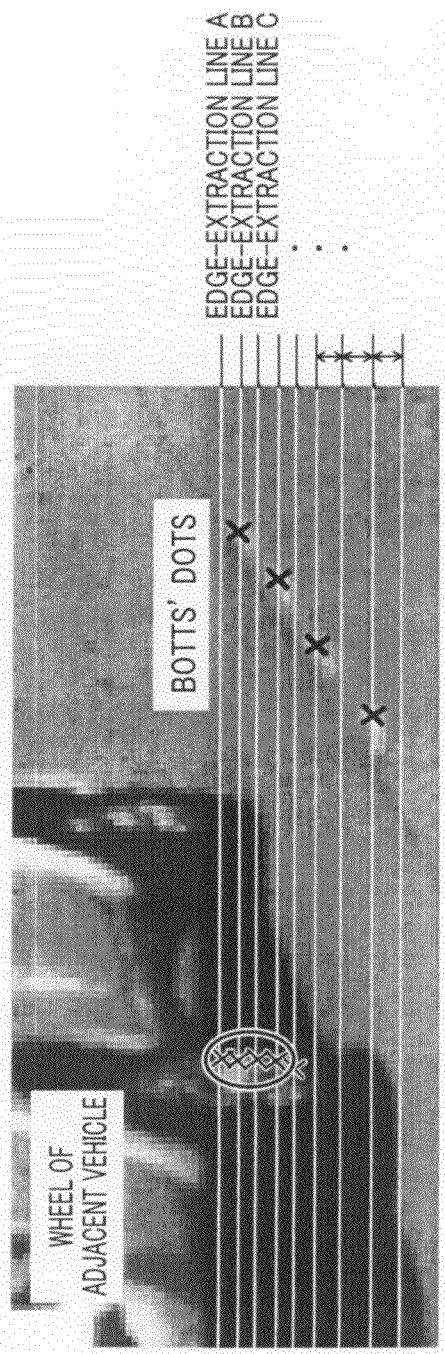

(A) of FIG. 3 is a view schematically illustrating an example of frame images picked up by a camera illustrated in FIG. 1 according to the embodiment;

(B) of FIG. 3 is a graph schematically illustrating the intensity values of pixels located on an edge-extraction line illustrated in (A) of FIG. 3;

(A) of FIG. 4 is an enlarged view of a region 48 illustrated in (A) of FIG. 4, which contains Botts' dots and a wheel portion;

(B) of FIG. 4 is a view schematically illustrating a data matrix in the form of cells arranged in matrix, which corresponds to (A) of FIG. 4; and (A) of FIG. 5 is a view schematically illustrating another data matrix in the form of cells arranged in matrix, which corresponds to (A) of FIG. 4; and (B) of FIG. 5 is a view schematically illustrating a further data matrix in the form of cells arranged in matrix, which corresponds to (A) of FIG. 4.

DETAILED DESCRIPTION OF EMBODIMENT

An embodiment of the present disclosure will be described hereinafter with reference to the accompanying drawings. In the drawings, identical reference characters are utilized to identify corresponding identical components.

This embodiment of the present disclosure is, as an example, applied to a lane departure alarming system 1 installed in a motor vehicle MV as an example of vehicles.

Note that, in the specification, "boundary lines" means boundary markers in the form of objects or lines to divide a corresponding road into plural parts as lanes, such as painted lines (white or orange solid/dashed lines) and raised markers (Botts dots and Cat's eyes).

Referring to FIG. 1, the lane departure alarming system 1 is comprised of an in-vehicle network 10 provided in the motor vehicle MV, an image sensor 12, and an alarm device 14, such as a buzzer. A plurality of devices including a yaw angle sensor 20 and a vehicle speed sensor 22 are communicably coupled to the image sensor 12 using, for example, the CAN protocol. The image sensor 12 is communicably coupled to the alarm device 14.

The image sensor 12 is comprised of a camera 30 and an image-processing ECU 32 communicably coupled to each other.

The camera 30 is mounted on a portion of the body (outer shell) of the motor vehicle at which the camera 30 can pick up images ahead of the motor vehicle MV. For example, the camera 30 is mounted on the front side of the body (outer shell) of the motor vehicle MV. The camera 30 has a field of view (an area that the camera 30 can pick up), and the field of view includes a predetermined target region on a road (road surface) ahead of the motor vehicle MV, and a part of air above the road.

The camera 30 is operative to successively pick up two-dimensional images (frame images) of a target region at a preset frame rate, such as $1/15$ seconds, on a road ahead of the motor vehicle MV. The vertical direction and horizontal direction of each picked-up image correspond to the forward direction and the width direction of the vehicle, respectively.

Each picked-up image for example consists of a plurality of pixels arrayed in matrix; each of the pixels represents the light intensity (luminance) of a corresponding location thereof. As the camera 30, a CCD camera or a camera with a video camera tube for taking visible frame images, or an infrared camera for taking infrared frame images can be used.

For example, the camera 30 is comprised of an optical system, a shutter, an image pickup device, an amplifier, an A/D converter, and a controller. The optical system includes a lens for collecting and focusing light, and an aperture as an opening with an adjustable size, which allows part of the light collected by the lens to pass therethrough to thereby control the amount of light to be picked up by the image pickup device. The shutter is designed to be openable and operative to control the time (exposure time) during which the light passing through the aperture reaches the image pickup device. That is, the opening speed (shutter speed) determines the time during which the light passing through the aperture reaches the image pickup device.

The image pickup device consists of a plurality of light-sensitive elements arrayed in matrix constituting a light sensitive pixel area; each of the light-sensitive elements corresponds to one pixel of an image to be picked up by the image pickup device.

When light (visible light or invisible light) is received by the light sensitive pixel area of the image pickup device, the received light is converted into an electric analog image (frame image) by the light-sensitive elements. The frame image is amplified by the amplifier using an adjustable gain, and the amplified frame image is converted into a digital frame image with, for example, 8-bit gray scale (256 levels of gray scale). Thus, the light intensity (luminance) of a frame image picked by each light-sensitive element of the image pickup device is converted into a value (pixel value, gray value, or intensity value) of a corresponding pixel of a digital frame image within the range from 0 to 255. The frame image can be converted into a digital frame image, and the digital frame image can be amplified using an adjustable gain.

The digital frame image is outputted from the camera 30 to the image-processing ECU 32. Thus, the camera 30 is configured to successively take frame images of the target region on a road (road surface) ahead of the motor vehicle MV and a part of air above the road at the preset frame rate, and successively output digital frame images corresponding to the taken frame images to the image-processing ECU 32.

The controller of the camera 30 is operative to adjust the shutter speed, the gain, and the frame rate according to instructions sent from the image-processing ECU 32.

The image-processing ECU 32 is designed as, for example, a normal microcomputer circuit consisting of, for example, a CPU; a storage medium 32a including a ROM (Read Only Memory), such as a rewritable ROM, a RAM (Random Access Memory), and the like; an I/O (Input and output) interface; buses; and so on. The CPU, storage medium 32a, and the I/O interface are communicably connected with each other via the buses. The storage medium 32a stores therein beforehand various programs including a lane-departure alarming program PR.

The yaw angle sensor 20 is operative to measure the yaw angle (the angle of deviation between the longitudinal axis of the motor vehicle MV and its true direction of motion) of the motor vehicle MV, and output, to the image-processing ECU 32, the measured yaw angle.

The vehicle speed sensor 22 is operative to measure the speed of the motor vehicle MV and output, to the image-processing ECU 32, the measured speed of the motor vehicle MV.

The image-processing ECU 32 is operative to output, to the controller of the camera 30, the instructions that cause the controller of the camera 30 to adjust the shutter speed, the frame rate, and the gain of the camera 30 so that the brightness (luminance) of frame images picked-up by the camera 30 is within a predetermined range.

In addition, the image-processing ECU 32 is designed to run the lane-departure alarming program PR using frame image data inputted from the camera 30 described later. That is, the lane-departure alarming program PR causes the image-processing ECU 32 to detect (recognize) boundary lines formed on a road in front of the motor vehicle MV, determine whether the motor vehicle MV will depart from a corresponding lane based on the detected boundary lines, and output a control signal to the alarm device 9 for requesting the output of an alarm signal when it is determined that the motor vehicle MV will depart from the corresponding lane.

In other words, the lane-departure alarming program PR causes the image-processing ECU 32 to function as an edge point extractor F1, a noise determiner F2, a boundary line detector F3, a lane departure determiner F4, and an alarm signal requester F5.

The alarm device 9 is equipped with a speaker and/or a display and operative to output, from the speaker, an audible alarm and/or output, on the display, a visible alarm (warning message) in response to receiving the control signal from the image-processing ECU 32. The audible alarm and the visible alarm, for example, prompt the driver of the motor vehicle MV to operate the steering wheel so as to prevent the lane departure.

Next, a lane-departure alarming task to be run by the image-processing ECU 32 in accordance with the lane-departure alarming program PR will be described hereinafter with reference to FIGS. 2 to 5. The lane-departure alarming program PR is launched so that the lane-departure alarming task is started when an accessory switch (not shown) is turned on. The lane-departure alarming task is repeatedly carried out until the accessory switch is turned off so that the image sensor 12 is deenergized.

When launching the lane-departure alarming program PR, the image-processing ECU 32, referred to simply as "ECU 32", captures a digital frame image as a current frame image picked up by the camera 30 and outputted therefrom in step S10.

An example of the current frame image is illustrated in (A) of FIG. 3 by reference numeral 40. The current frame image 40 is a picked-up image of a road (road surface) ahead of the motor vehicle MV and a part of air above the road. On the current frame image 40, Botts' dots 44 and an adjacent vehicle adjacent to the motor vehicle MV are projected.

As described later, the lane-departure alarming task is repeatedly carried out by the ECU 32 each time a digital frame image is captured and outputted from the camera 30 as a current frame image. In other words, after the lane-departure detection task has been applied for a frame image, when a new frame image is picked up by the camera 30 and captured by the ECU 32 as a current frame image, the frame image for which the lane-marker recognition task has been applied will be referred to as the previous frame image.

Next, the ECU 32 extracts edge points in the current frame image 40 in, for example, the following specific approach in step S12.

First, the ECU 32 establishes a plurality of edge-extraction lines 42 on the current frame image 40 in the horizontal direction. An edge-extraction line 42 is illustrated in (A) of FIG. 3. As illustrated in (A) of FIG. 4, spaces between the respective adjacent edge-extraction lines 42 are gradually narrowed from the near side of the motor vehicle MV to the far side thereof so that actual distances between the respective adjacent edge-extraction lines 42 are equal to each other; each actual distance is set to, for example, 10 centimeters.

Second, the ECU 32 samples the light intensity values of all pixels on each of the plurality of edge-extraction lines 42. (B) of FIG. 3 represents the intensity values of the pixels located on the edge-extraction line 42 illustrated in (A) of FIG. 3. The horizontal direction of (B) of FIG. 3 represents positions of the pixels on the edge-extraction line 42 in the horizontal direction, and the vertical direction thereof represents intensity values of the pixels on the edge-extraction line 42 in the horizontal direction.

As illustrated in (B) of FIG. 3, a first region on the edge-extraction line 42 in which Botts' dots 44 are located has higher intensity values than another region around the first region, and a second region on the edge-extraction line 42 in which a wheel 46 of the adjacent vehicle is located has higher intensity values than another region around the second region.

Third, the ECU 32 subjects each pixel on each of the plurality of edge-extraction lines 42 to a differential filter to thereby detect differential values (changes) of the intensity values of all pixels on each of the plurality of edge-extraction lines 42. The ECU 32 extracts at least one pair of a positive peak value and a negative peak value in the intensity values of all pixels on each of the plurality of edge-extraction lines 42. The ECU 32 extracts, as edge points in the current frame image 40, positions of pixels which correspond to the at least one pair of the positive and negative peak values on each of the plurality of edge-extraction lines 42.

Following the operation in step S12, the ECU 32 removes some edge points successive in the vertical direction of the current frame image 40 in all of the edge points extracted in step S12 as noises in step S14.

(A) of FIG. 4 is an enlarged view of a region 48 containing the Botts' dots 44 and the wheel portion 46. The edge points extracted in step S12 are illustrated in (A) of FIG. 4 as "X" (cross marks). Note that the cross marks are specially illustrated on the current frame image 40 in order to simply explain the operation in step S14, and therefore, in actual step S14, there are no need to assign these marks to the edge points extracted in step S12.

(B) of FIG. 4 schematically illustrates a data matrix in the form of cells arranged in matrix, which corresponds to (A) of FIG. 4. Each horizontal row in the data matrix represents a corresponding one of the edge-extraction lines 42 in the region 48. Specifically, the number of the horizontal rows in the data matrix corresponds to the number of the edge-extraction lines 42 in the region 48, and the horizontal rows in the data matrix are vertically aligned as the corresponding edge-extraction lines 42 are vertically aligned in the region 48. Each vertical column in the data matrix represents a corresponding one line of vertically aligned pixels in the region 48.

In the data matrix illustrated in (B) of FIG. 4, a cell of "0" represents a non-edge point, and a cell of "1" represents an extracted edge point. Note that, because the data matrix is schematically illustrated, the number of cells in the data matrix need not be matched with the number of pixels in the region 48 of the current frame image.

As illustrated in (A) of FIG. 4, because the actual Botts' dots 44 are arranged on a corresponding boundary of lanes on the road ahead of the motor vehicle MV in its travelling direction, the extracted edge points corresponding to the Botts' dots 44 are obliquely arranged in the current frame image 40. In contrast, because one side of a wheel 46 is vertically arranged on the road ahead of the motor vehicle MV, the extracted edge points corresponding to the wheel portion 46 are vertically aligned in the current frame image 40.

In this embodiment, in step S14, the ECU 32 extracts, from all of the edge points extracted in step S12, a number of edge points (cells of "1") vertically aligned in the current frame image 40, which is equal to or greater than a preset number, such as three, as noises; the number of the vertically aligned edge points has a given number of non-edge points equal to or smaller than a preset number (interval) between at least one pair of adjacent edge points therein. In this embodiment, the number of the vertically aligned edge points has no non-edge points, in other words, the number of the vertically aligned edge points are successively arranged. For example, in (B) of FIG. 4, because four edge points corresponding to the wheel portion 46 are vertically aligned, the ECU 32 determines that the four edge points corresponding to the wheel portion 46 as noises in step S14.

Then, the ECU 32 eliminates the edge points determined as noises from the edge points extracted in step S12, in other words, deletes data of the edge points determined as noises from data of the edge points extracted in step S12 in step S14, proceeding to step S16.

In step S16, the ECU 32 extracts boundary lines in the current frame image 40 based on the remainder of the edge points extracted in step S12 from which the determined edge points as the noises have been eliminated in step S14. For example, in step S16, the ECU 32 subjects the remainder of the edge points extracted in step S12 to the Hough transform, and extracts a pair of edge lines in a plurality of edge lines; one of the pair of edge lines passes through the largest number of edge points in the reminder of the extracted edge points on the right side of the motor vehicle MV in the travelling direction, and the other thereof passes through the largest number of edge points in the remainder of the extracted edge points on the left side of the motor vehicle MV in the travelling direction.

In step S14, in place of the Hough transform, in order to extract edge points, the known Canny method and/or the known differential edge detection method can be used.

In step S16, the ECU 32 stores, in a history file HF in the storage medium 32a, the extracted pair of edge lines. Specifically, the pair of edge lines that have been extracted for each of a preset number of previous frames have been stored in the history file HF.

Next, the ECU 32 calculates positions of a pair of boundary lines based on the extracted pair of edge lines in step S18.

For example, in step S18, the ECU 32 samples, from the history file HF, a number of temporally adjacent pairs of the extracted edge lines including the currently extracted pair of edge lines. For example, in this embodiment, the ECU 32 samples, from the history file HF, three temporally adjacent pairs of the extracted edge lines including the currently extracted pair of edge lines. Then, the ECU 32 calculates positions of a pair of boundary lines based on the sampled three pairs of the extracted edge lines to thereby recognize a lane on which the motor vehicle MV is running based on the calculated positions of the boundary lines.

In step S18, the ECU 32 calculates a distance of the motor vehicle MV to each of the recognized boundary lines.

Next, in step S20, the ECU 32 determines whether the motor vehicle MV will depart from the recognized lane based on the calculated positions of the boundary lines, calculated distances, the measured yaw angle by the yaw angle sensor 20, and the measured speed of the motor vehicle MV by the vehicle speed sensor 22. Specifically, the ECU 32 predicts a future running pass of the motor vehicle MV based on the measured yaw angle and the measured speed of the motor vehicle MV. Then, the ECU 32 calculates, based on the calculated positions of the boundary lines, calculated distance of the motor vehicle MV to each of the recognized boundary lines, and the predicted future running pass, a time required for the motor vehicle MV to depart from the lane, on which the motor vehicle MV is running, which is constructed by the boundary lines.

In step S20, the ECU 32 determines whether the calculated time is equal to or larger than a preset threshold, such as 1 second in this embodiment.

When the calculated time is smaller than the preset threshold (YES in step S20), the ECU 32 determines there is a risk of lane departure of the motor vehicle MV, then outputting the control signal to the alarm device 9 for requesting the output of an alarm signal in step S22.

As a result, the alarm device 9 outputs, from the speaker, an audible alarm and/or outputs, on the display, a visible alarm (warning message) in response to receiving the control signal from the image-processing ECU 32. The audible alarm and the visible alarm prompt the driver of the motor vehicle MV to operate the steering wheel so as to prevent the lane departure.

Otherwise, when the calculated time is equal to or larger than the preset threshold (NO in step S20), the ECU 32 determines that the motor vehicle MV will not depart from the lane on which the motor vehicle MV is running, returning to step S10, and carries out the operations in steps S10 to S20 or S22 based on a current frame image captured from the camera 30. In other words, the ECU 32 repeatedly carries out the operations in steps S10 to S20 or S22 each time a digital frame image is captured and outputted from the camera 30 as a current frame image.

As described above, the lane departure alarming system 1 according to this embodiment is configured to eliminate some edge points aligned in the vertical direction of the current frame image in all of the edge points extracted in step S12 as noises; this vertical direction corresponds to the actual vertical direction of the road ahead of the vehicle MV. The edge points aligned in the vertical direction of the current frame image correspond to edge points of structural objects each located vertically on the road ahead of the vehicle MV can be distinguished from edge points of boundary markers on the road ahead of the vehicle MV. Thus, the lane departure alarming system 1 removes edge points of structural objects each located vertically on the road ahead of the vehicle MV as noises.

Particularly, the lane departure alarming system 1 according to this embodiment is configured to detect boundary lines on a road ahead of the motor vehicle MV based on Botts' dots 44 located thereon. These Botts' dots have a limited height that allows vehicles to run above them, and are arranged at intervals in the length direction of a corresponding lane. For this reason, edge points of the Botts' dots are unlikely to be aligned in the vertical direction of the current frame image; this vertical direction corresponds to the actual vertical direction of the road ahead of the motor vehicle MV. Thus, removal of the vertically aligned edge points in all of the extracted edge points from the current frame image reliably leaves the edge points of the Botts' dots, making it possible to reliably detect boundary lines on a road ahead of the motor vehicle MV based on the Botts' dots.

In this embodiment, the plurality of edge-extraction lines 42 are arranged so that actual distances between the respective adjacent edge-extraction lines 42 are equal to each other. In addition, the determination of whether extracted edge points are noises or not is carried out based on, as the criteria of the determination, a number of vertically aligned extracted edge points. That is, if a first group of vertically aligned edge points are the same in number as a second group of vertically aligned edge points, the lane departure alarming system 1 determines each of the first group of vertically aligned edge points and the second group of vertically aligned edge points as noises using the same criteria of the determination.

This prevents the criteria of the determination of whether extracted edge points are noises or not from vacillating irrespective of where the extracted edge points are located in the current frame image. This reduces there are risks that edge points of a structural object projected on one frame image are determined to be noises, and edge points of the same structural object projected on another frame image are determined not to be noises so that recognition of boundary lines is not properly carried out.

The present disclosure is not limited to the aforementioned embodiment, and can be applied in various modified embodiments within the scope of the present disclosure.

For example, the lane departure alarming system 1 is designed to extract, from all of the edge points extracted in step S12, three or more of edge points (cells of "1") vertically aligned in the current frame image 40 as noises, but can be designed to extract, from all of the edge points extracted in step S12, a given number of edge points (cells of "1") vertically aligned in the current frame image 40 as noises; this given number is equal to or greater than two.

Edge points as determined as noises according to this embodiment do not necessarily include edge points that are not strictly aligned in the vertical direction of the current frame image. For example, as illustrated in (A) of FIG. 5, if vertically aligned edge points (cells of "1") include therein-side a few non-edge points (cells of "0"), these edge points including a few non-edge points can be determined as edge points of noises.

As another example, as illustrated in (B) of FIG. 5, if edge points of a few number of adjacent columns, such as two adjacent columns, are totally aligned vertically, these edge points can be determined as edge points of noises.

In this embodiment, the determination of whether extracted edge points are noises or not is carried out based on, as the criteria of the determination, a number of vertically aligned extracted edge points. However, the present disclosure is not limited to the structure.

Specifically, the plurality of edge-extraction lines 42 can be arranged so that distances between the respective adjacent edge-extraction lines 42 on the current frame image are equal to each other (that is, the plurality of edge-extraction lines 42 can be arranged on the current frame image at regular intervals in the vertical direction thereof).

In this modification, in step S14, the ECU 32 can convert the length of vertically aligned edge points on the current frame image in all of the extracted edge points in step S12 into an actual distance, and, if the converted actual distance exceeds a preset threshold distance, can determine the vertically aligned edge points as noises. In this modification, in step S14, the ECU 32 also can determine whether the length of vertically aligned edge points on the current frame image in all of the extracted edge points in step S12, and, if the distance exceeds a preset threshold distance, can determine the vertically aligned edge points as noises.

In this modification, the ECU 32 can increase, as the criteria of the determination, a number of vertically aligned edge points when determining whether the vertically aligned edge points in a region of the current frame image close to the motor vehicle MV are noises or not. Similarly, the ECU 32 can reduce, as the criteria of the determination, a number of vertically arranged edge points when determining whether the vertically arranged edge points in a region of the current frame image away from the motor vehicle MV are noises or not.

Note that, because the lane departure alarming system 1 according to this embodiment uses, as the criteria of the determination of whether vertically arranged edge points are noises or not, a number of the vertically arranged edge points, it cannot carry out such conversions of the threshold, making it possible to maintain the processing load of the ECU 32 at a lower level in comparison to that of the ECU 32 in each of the examples of the modification set forth above.

In this embodiment, the ECU 32 determines whether vertically aligned edge points are noises or not using the data matrix consisting of edge points (cells of "1") extracted in step S12 and non-edge points (cells of "0") non-extracted therein, but can determine whether vertically aligned edge points are noises or not without using such a data matrix as long as it is possible to determine that edge points as noises are vertically aligned.

The lane departure alarming system 1 according to this embodiment is configured to extract edge points of Botts' dots on a road ahead of the motor vehicle MV, and detect boundary lines based on the edge points of the Botts' dots, but, of course, it can be configured to detect boundary lines based on another boundary marker except for the Botts' dots. That is, boundary markers except for the Botts' dots include structural objects of boundary lines, such as painted lines (white or orange solid/dashed lines) and raised markers (Cat's eyes). Note that, pointed markers (Botts' dots, Cat's eyes, and raised markers), which are arranged at intervals along a corresponding lane, are likely smaller in a number of extracted edge points than liner markers (solid or dashed painted lines), which has a certain degree of length in a corresponding lane. Thus, if vertically aligned edge points in the current frame image were extracted as edge points of pointed markers, there could be misdetection of boundary lines based on the extracted edge points. However, the lane departure alarming system 1 according to this embodiment reduces such risks.

Note that, the ECU 32 continuously carries out the aforementioned noise removal during the image sensor 12 being activated, but it can carry out the noise removal in its preset operating mode.

Figure 2:
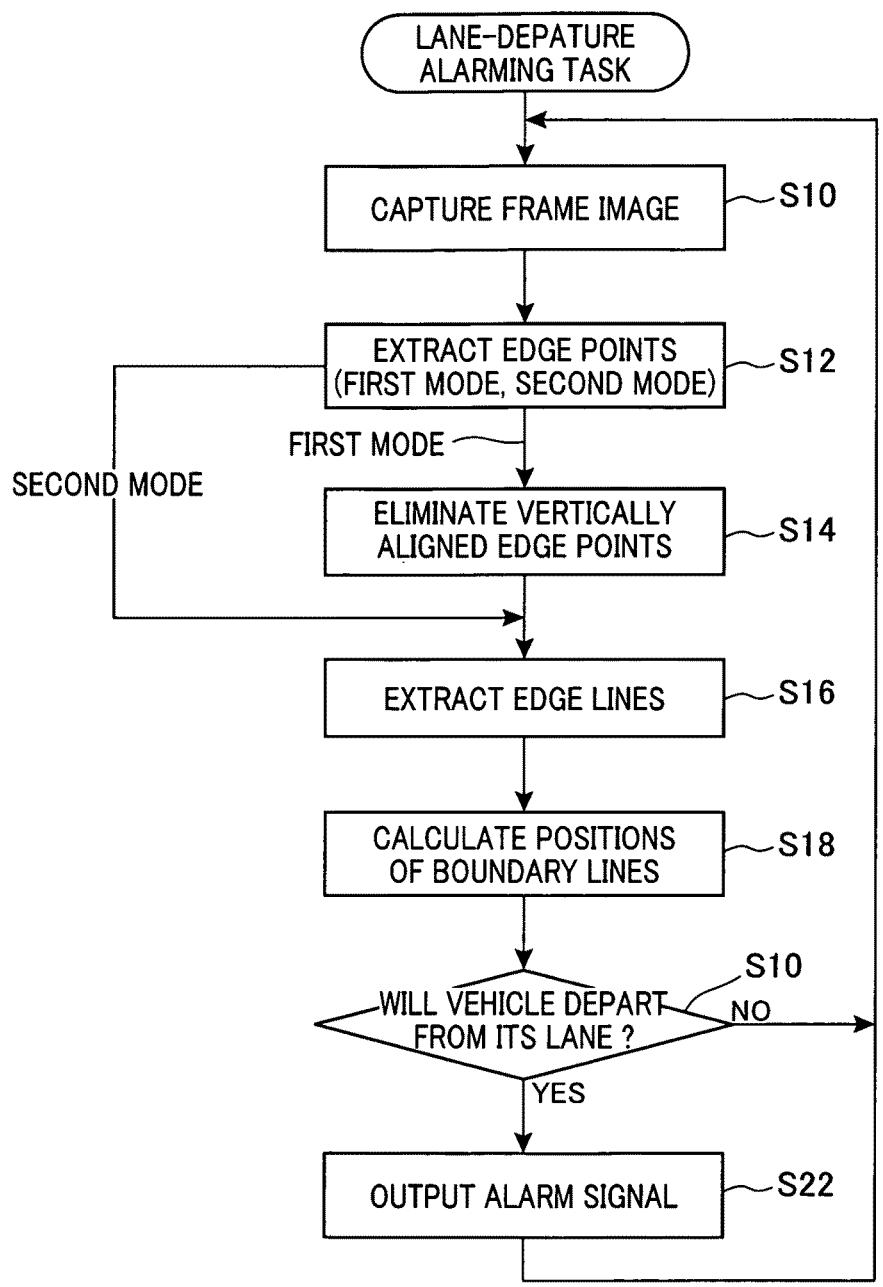
FIG. 2 is a flowchart schematically illustrating a lane-departure alarming task to be run by an image-processing ECU illustrated in FIG. 1 according to the embodiment.

Specifically, as illustrated in FIG. 2, the ECU 32 operates in a first mode to extract edge points for pointed markers in the current frame image in the specific approach set forth above, and operates in a second mode to extract edge points for linear markers in the current frame image in the specific approach set forth above.

After extraction of the edge points for the pointed markers, the ECU 32 in the first mode proceeds to step S14, and carries out the noise removable to remove noises from the extracted edge points. In contrast, after extraction of the edge points for the liner markers, the ECU 32 in the second mode proceeds to step S16 while skipping the operation in step S14, thus disabling the noise removable in the second mode.

Specifically, in the second mode, because a large number of edge points of painted lines are extracted in step S12, it is possible to stably detect boundary lines based on the extracted edge points even if the extracted edge points contain a few edge points of noises. Thus, it is possible to reduce the processing load of the ECU 32.

Particularly, the ECU 32 in the second mode can prevent edge points of liner markers as noises because it does not carry out the noise removable.

While an illustrative embodiment of the present disclosure have been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A boundary line detection system for detecting boundary lines according to an image of a road surface in front of a vehicle, the boundary line detection system comprising:
   an image pickup unit that picks up the image of the road surface;
   an edge-point extracting unit that extracts a plurality of edge points from the image of the road surface picked-up by the image pickup unit;
   a noise determining unit that:
   determines whether at least a predetermined number of edge points in the plurality of edge points are aligned in a direction corresponding to a vertical direction from the road surface, the at least predetermined number of edge points having intervals therebetween equal to or smaller than a preset interval; and
   when it is determined that the at least predetermined number of edge points are aligned in the direction corresponding to the vertical direction from the road surface with the intervals of the at least predetermined number of edge points being equal to or smaller than the preset interval, determines that the predetermined number of edge points as noises; and
   a detecting unit that detects the boundary lines based on a remainder of the plurality of edge points from which the at least predetermined number of edge points as the noises have been extracted, wherein:
   the boundary lines include a plurality of pointed markers arranged at intervals on the road surface along a lane on the road surface;
   the edge-point extracting unit is configured to extract the plurality of edge points on a plurality of lines on the image of the road surface, the plurality of lines corresponding to a horizontal direction of the road surface; and
   the plurality of lines are determined such that actual distances between positions respectively corresponding to the plurality of lines on the road surface are equal to each other.

2. The boundary line detection system according to claim 1, wherein:
   the boundary line detection system is configured to switchably operate in a first mode to detect boundary lines constructed by the plurality of pointed markers and in a second mode to detect a boundary line constructed by a linear marker having a preset length in a travelling direction, the linear marker being arranged on a boundary of lanes on the road surface; and
   the noise determining unit is activated when the boundary line detection system operates in the first mode.

3. The boundary line detection system according to claim 1, wherein the noise determining unit is configured to:
   determine whether three or more edge points in the plurality of edge points are aligned in the direction corresponding to the vertical direction from the road surface, the three or more of edge points having the intervals therebetween equal to or smaller than the preset interval; and
   when it is determined that the three or more edge points are aligned in the direction corresponding to the vertical direction from the road surface with the intervals of the at least predetermined number of edge points being equal to or smaller than the preset interval, determine that the three or more edge points as noises.

* * * * *